(12) United States Patent
Iversen et al.

(10) Patent No.: US 7,829,598 B2
(45) Date of Patent: Nov. 9, 2010

(54) PRODUCTION OF NANOSIZED MATERIALS

(75) Inventors: Steen Brummerstedt Iversen, Vedbaek (DK); Henrik Jensen, Oelstykke (DK)

(73) Assignee: SCF Technologies A/S, Herlev (DK)

( * ) Notice: Subject to any disclaimer, the term of this patent is extended or adjusted under 35 U.S.C. 154(b) by 0 days.

(21) Appl. No.: 12/096,897

(22) PCT Filed: Dec. 11, 2006

(86) PCT No.: PCT/DK2006/000706

§ 371 (c)(1),
(2), (4) Date: Sep. 9, 2008

(87) PCT Pub. No.: WO2007/065446

PCT Pub. Date: Jun. 14, 2007

(65) Prior Publication Data

US 2009/0004099 A1 Jan. 1, 2009

(30) Foreign Application Priority Data

Dec. 11, 2005 (DK) ............................... 2005 01755

(51) Int. Cl.
*B01F 3/12* (2006.01)
(52) U.S. Cl. .......................... 516/33; 516/9; 423/610; 204/157.43
(58) Field of Classification Search ............... 516/33, 516/9; 423/610; 205/157.43
See application file for complete search history.

(56) References Cited

U.S. PATENT DOCUMENTS

| 203,207 | A |   | 4/1878 | Springer |
|---|---|---|---|---|
| 4,338,199 | A | * | 7/1982 | Modell ...................... 210/721 |
| 5,433,878 | A | * | 7/1995 | Arai et al. ................ 252/62.63 |
| 5,635,154 | A | * | 6/1997 | Arai et al. .................... 423/263 |
| 6,123,907 | A | * | 9/2000 | Yamasaki et al. ........... 422/224 |
| 2004/0228967 | A1 |   | 11/2004 | Leung et al. |
| 2006/0182677 | A1 | * | 8/2006 | Myeong et al. ............. 423/263 |

FOREIGN PATENT DOCUMENTS

| EP | 0783921 | 9/2001 |
|---|---|---|
| WO | WO 03/048403 | 6/2003 |
| WO | WO 2005/077505 | 8/2005 |
| WO | WO 2005/123980 | 12/2005 |
| WO | WO 2007/013881 | 2/2007 |

OTHER PUBLICATIONS

Viswanathan et al. (Formation of Zinc Oxide-Titanium Dioxide Composite Nanoparticles in Supercritical Water, Ind. Eng. Chem. Res., 2003 American Chemical Society, Published on Web Sep. 26, 2003, 42, 5535-5540).*
Yu et al. ("Synthesis of Nanoscale Platinum Colloids by Microwave Dielectric Heating", Langmuir 1999, 15, 6-9).*
Viswanathan et al. (Formation of zinc oxide nanoparticles in supercritical water, journal of Supercritical Fluids 27 (2003) 187-193).*
Zeta Potential An Introduction in 30 Minutes, referred as "Zeta Potential", (Technical note form Malvern Instruments Published on web Feb. 15, 2006).*
Adschiri et al. ("Hydrothermal Synthesis of Metal Oxide Fine Particles at Supercritical Conditions", Ind. Eng. Chem. Res., 2000, 39 (12), pp. 4901-4907).*
Adschiri et al., Hydrothermal Synthesis of Metal Oxide Fine Particles at Supercritical Conditions, Ind. Eng. Chem. Res. 2000, 39:4901-4907.
Bocquet et al., A new TiO2 film deposition process in a supercritical fluid, Surface and Coatings Technology, 1994, 70:73-78.
Brand et al., Ceramic beams and thin film growth, Thin Solid Films, 1988, 166:139-148.
Hald, et al., Supercritical Propanol-Water Synthesis and Comprhensive Size Characterisation of Highly Crystalline anatase TiO2 Nanoparticles, Journal of Soled State Shemistry, 2006, 0022-4596/S, Available online May 23, 2006.
Hertz et al., Synthesis and encapsulation of yttria stabilized zirconia particles in supercritical carbon dioxide, Journal of the European Ceramic Society, Elsevier Science Publishers, Barking, Exxex, GB, No. 7, February 2005, pp. 1195-1203.
Yu et al., Synthesis of nanoscale platinum colloids by microwave dielectric heating, Langmuir, 1999, 15:6-9.

* cited by examiner

*Primary Examiner*—Ling-Siu Choi
*Assistant Examiner*—Chun-Cheng Wang
(74) *Attorney, Agent, or Firm*—Knobbe Martens Olson & Bear LLP

(57) ABSTRACT

The present invention relates to a method of producing a nano-sized material such as in the form of a colloidal suspension of nano-sized particles and/or as a coating and/or as a thin film comprised by such nano-sized particles on the surface of a substrate. The invention also relates to an apparatus for carrying out the method according to the present invention.

50 Claims, 7 Drawing Sheets

PRODUCTION OF NANOSIZED MATERIALS

CROSS REFERENCE TO RELATED APPLICATION

Figure 1:
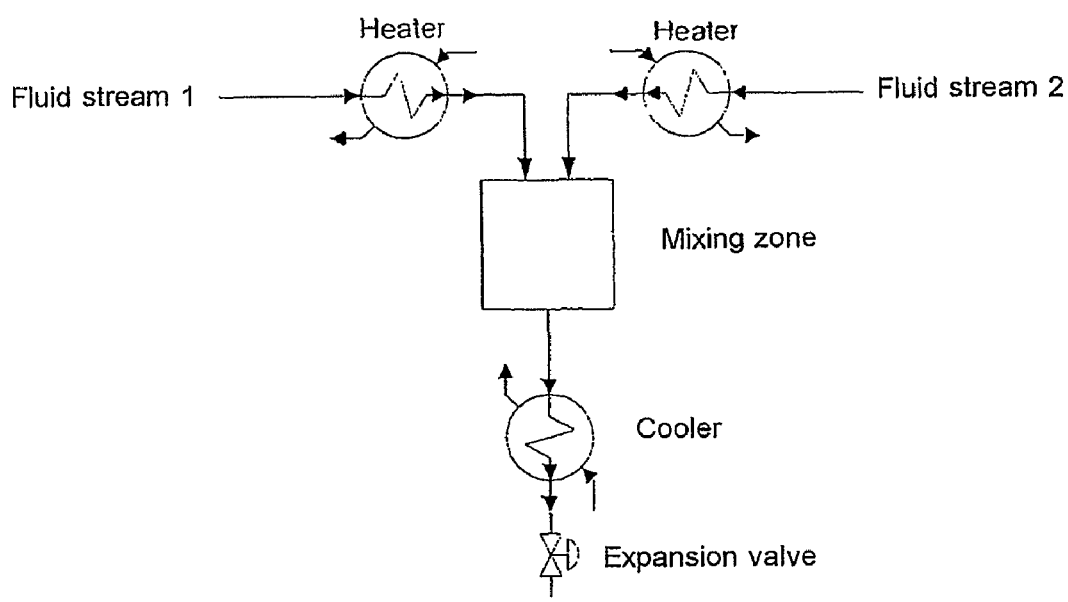

This application is a national phase application of and claims the benefit of priority to PCT/DK/2006/000706, filed Dec. 11, 2006, which designated the United States and was published in English and claims the benefit of priority to Danish Patent Application No. 2005 01755, filed on Dec. 11, 2005. The disclosures of all of the aforementioned applications are hereby expressly incorporated by reference in their entirety.

The present invention relates to a method of producing a nano-sized material such as in the form of a colloidal suspension of nano-sized particles and/or as a coating and/or as a thin film comprised by such nano-sized particles on the surface of a substrate. The invention also relates to an apparatus for carrying out the method according to the present invention.

BACKGROUND

There is an increasing interest in nano-sized materials in numerous technical applications. Such nano-structured materials are cornerstones in many attempts to develop and exploit nanotechnology. They exhibit properties, which are significantly different from those of the same materials of larger size. During the last decade, the insight in to nano-structured materials has dramatically improved through the application of new experimental methods for characterization of materials at the nano-scale. This has resulted in the synthesis of unique new materials with unprecedented functional properties. For nano-structured coatings, physical properties such as elastic modulus, strength, hardness, ductility, diffusivity, and thermal expansion coefficient can be manipulated based on nano-meter control of the primary particle or grain size. For nano structured powders parameters such as the surface area, solubility, electronic structure and thermal conductivity are uniquely size dependent.

The novel properties of such nano-structured materials can be exploited and numerous new applications can be developed by using them in different industries. Examples of potential applications include new materials such as improved thermoelectric materials, electronics, coatings, semiconductors, high temperature superconductors, optical fibres, optical barriers, photographic materials, organic crystals, magnetic materials, shape changing alloys, polymers, conducting polymers, ceramics, catalysts, electronics, paints, coatings, lubricants, pesticides, thin films, composite materials, foods, food additives, antimicrobials, sunscreens, solar cells, cosmetics, drug delivery systems for controlled release and targeting, etc.

Addressing and exploiting such promising applications with new materials generally requires an improved price-performance ratio for the production of such nanostructured materials. The key parameters determining the performance are the primary particle (grain) size, size distribution of the primary particles, chemical composition and chemical purity as well as the surface area of powders, while the primary parameters for in relation to price are the ease of processing and suitability for mass production.

Several techniques have been used in the past for the manufacture of micron- or nano sized particles. Conventional techniques for submicron powders include spray drying, freeze drying, milling and fluid grinding, which are capable of producing powders in the micrometer range. Manufacturing techniques for producing submicron materials include high temperature vapour phase techniques such as flame synthesis and plasma arc methods, which allow production of nano-scaled powders consisting of hard or soft agglomerates of primary particles.

Solution sol-gel and hydrothermal synthesis are the major low temperature processes for production of fine particles with nano-scaled primary particles or grains.

Sol-gel processing is widely used as it is a versatile technology that allows production of homogeneous high purity fine particles with a relatively small primary particle size to be produced from numerous materials in the form of powders, films, fibres, spheres, monoliths, aerogels, xerogels as well as coatings. The precursors can be metal organics, metals, inorganic salts etc.

The key drawbacks from the sol-gel process are that it is time consuming, and need after treatment such as drying and calcinations. In the traditional sol-gel process, it is necessary to calcine the product for up to 24 hours in order to obtain a crystalline product. In addition to a higher energy usage and a more complicated process this has the unfortunate effect that substantially growth of primary particles occurs, and that the specific surface area may be decreased by up to 80%.

Hydrothermal processing have been used for batch synthesis of a wide range fine such oxide powders such as nano-sized materials in nearly a century. The term hydrothermal relates to the use of water as reaction medium and regime of high pressure and the medium to high temperature applied. A major drawback is the relatively long reaction and aging time e.g. hours to days required at low to medium temperatures and the very corrosive environment at higher temperature. Further, the characteristics of said nano-sized products is greatly influenced by factors such as heating rate, temperature, concentrations of precursors and/or reactants. Typical the result is a product having a wide particle size distribution, and it is difficult to obtain a uniform product with well defined characteristics in the nanoregime.

Arai and Adschiri (U.S. Pat. No. 5,635,154) discloses a process for production of fine oxide particles by thermal decomposition of metal salts in water at sub- or supercritical conditions. The process comprises pumping a premixed fluid containing a metal salt into a pipe having a heating and a subsequent cooling zone. At the end of the pipe a discharge valve is arranged through which the produced material is discharged to a collecting chamber. The process may be performed in a continuous or semi-continuous mode and may result in nano sized materials for certain compounds and reactions conditions. However, though it do not disclose information of important characteristics such as primary particle size and secondary particle size, particle size distribution/-s, and how such characteristics is controlled. No information related to mixing is given and the process has several drawbacks.

Pessey et al (U.S. Pat. No. 0,203,207A1) discloses a coating process at near critical or supercritical conditions. Particles to be coated are kept dispersed in a reaction mixture with at least one precursor is dissolved in at least one solvent and brought under supercritical or slightly sub-critical pressure and temperature, and subsequently a conversion of said precursor or precursors is caused by increasing the temperature above the thermal decomposition temperature and/or by the action of a suitable reactant, whereby a film of a coating material is deposited on the surface of said particles, whereafter the fluid is brought into a gaseous state in order to remove the solvent.

Lester et al (WO 2005/077505A2) discloses a counter current mixing reactor for use in continuous synthesis of nanoparticles of metals or metal oxides in high temperature water with improved particle size and shape compared to previous designs of reactors. The mixing is disclosed as being between a heated pressurized or supercritical fluid and a denser fluid and the disclosure relates to a specific design of a mixing chamber.

Although the known methods and devices may have the potential to produce nano sized material, they still suffer from being able to efficiently producing a uniformly sized nano material and the devices used for producing the materials are typically blocked by the material being formed. In connection with the present invention it has been found that a commonly occurring cause to non-uniform size distribution and blocking stems from application of heat and/or cooling to obtain the required process conditions for formation of nano materials. The heating and/or cooling may be performed during or after mixing of fluids when a continuous production is performed or when a bath-process is performed to bring the fluid up to the required process conditions.

Typically, the fluid in which the reactions resulting in formation of nano materials is to occur is heated by adding heat to e.g. the wall of a reactor vessel in a heat-exchanger-like manner. Thereby a thermal boundary layer is generated inside the reactor where for instance the temperature of the fluid close to the wall of the reactor is so high that the reactants are destroyed, the temperature of the fluid in the center of the reactor is so low that unwanted reactions takes place.

In addition to this, the time needed for heating the fluid is typically so long that, again, unwanted reactions take place.

Furthermore, the combination of applying heat to a mixing device, where two fluids are mixed to form nano materials, in a heat exchanger like manner results also in a thermal boundary layer. The effect is typically that nano materials are produced in the fluid mixture only in the vicinity of the source of heat (typically the walls of the mixing device). Such locally formation of nano materials close to a surface results often in depositing of nano materials on the surface—in particular as the nano material formed precipitates from the fluid—resulting in blockage of the mixing device.

Although great effect may be put into the design of heat exchangers to minimize the thermal boundary layer precipitation and deposition on surfaces may still occur which tends to block the flow passages.

Thus, while many of the processes and devices suggested earlier have shown to be able to produce nano sized materials in short production runs and at laboratory scale, they still seem to suffer from not being scalable to longer production runs and with a higher output.

SUMMARY OF THE INVENTION

A major shortcoming in the widespread commercial exploitation of nanotechnology has so far been large scale production of nano-sized materials with sufficient homogeneity and reproducibility at affordable costs so as to make them competitive in the market.

Nano-sized materials in the present context generally comprise nano-sized particles such as grains, crystallites and the like. It should be understood that said nano-sized materials in this context, shall preferably be interpreted in broad terms. Said nano-sized may comprise anything from a single nano-sized particle, a cluster or clusters of nano-sized particles, agglomerates of nano-sized particles such as a powder, a colloidal suspension of such nanosized particles, a thin film or a coating on a substrate comprised by said nano-sized particles or even a bulk material comprised by said primary particles.

Different aspects of the present invention seek to meet one or more of the following objectives:

An objective of present invention may be to address the quality and availability of nano-sized materials by providing a method for production of such materials, which allows production of more homogeneous nano-materials than in the until now known methods i.e. nano-materials with a high purity and/or a controlled particle morphology, and/or a small average diameter and/or a narrower size distribution, and/or a more controlled phase and/or structure.

Another objective of the present invention may be to provide a method, which allow such high quality nano materials to be produced at shorter processing times and/or at lower temperatures and/or with a more controlled growth rate and/or with a more controlled morphology such as a more controllable crystallinity and/or shape than hitherto.

Still another objective of the present invention may be to provide a method suitable for large scale production of such nano-materials with more uniform and/or homogeneous properties, without suffering from prior art problems such frequent blocking of pipes.

A further objective of the present invention may be to provide an improved method for introducing fluid(s), and/or chemical reactant(s) and/or initiator(s) and/or precursor(s) and/or catalyst(s) into a reaction zone, e.g. avoiding frequent blockages of inlet pipes as for many until know designs.

A still further objective of the present invention may be to provide an improved method for controlling a chemical reaction in a dense fluid under near or supercritical conditions.

Still another further objective of the present invention may be to provide a method which reduce or eliminates the needs for post processing steps such as drying and calcinations.

It may also be an objective of the present invention to provide an apparatus for production of a nano-material according to the above described method.

Additionally, it may be an objective to provide a product obtained by the above described methods, and applications for use of said product.

These objectives and the advantages that will be evident from the following description are obtained by the following preferred embodiments of the invention.

In a first aspect, the present invention of relates to the synthesis of a nano-sized material. Hence, a preferred embodiment of a method according to the present invention comprises producing a nano-material by:

pressurising a first fluid, and heating said first fluid to a temperature above its critical temperature pressurising a second fluid, and heating said second fluid comprising at least one pre-cursor and/or reactant to a second temperature below the first temperature and below the thermal decomposition temperature of said precursor(s) and/or reactant(s), and mixing, and preferably controlling the mixing, the first fluid and the second fluid, preferably in a first mixing zone, so as to provide a fluid mixture at a temperature causing a conversion said precursors and/or reactants into a nano-sized material, preferably with predefined characteristics.

The heating and pressurisation of the first and/or of the second fluid are selected so that the mixed fluid has the conditions wanted for formation of nano materials. However, the formation may be endothermic and in order to keep the formation of nano materials going typically at a preferred rate—heat may be added to the fluid mixture and the method may preferably comprises maintaining said fluid mixture at said temperature in a predefined reaction time, while the fluid mixture is in the mixing zone.

Furthermore, the method may preferably comprises cooling said fluid mixture to a temperature below 100 C, and expanding said fluid mixture in one or more step/-s In accordance with preferred embodiments of the present invention the method may preferably comprising controlling the zeta potential and/or pH value of said fluid mixture so as to keep the produced material suspended in the fluid mixture. The controlling of the zeta potential of the mixed fluid may preferably be performed by controlling the pH value of said fluid mixture by addition of acid and/or base and/or may at least be controlled by the controlling the concentration of electrolytes present in said fluid mixture.

By this way of controlling the zeta potential and/or the pH value a stable suspension may be provided and the risk of precipitation and depositing of the produced nano material may become very limited whereby blocking by depositing of produced nano materials in the flow passages may be avoided.

As indicated above, a number of preferred embodiments of the present invention involve addition of heat; in the mixing zone, addition of heat may be provided to maintain the temperature of the mixed fluid. In such embodiments it is preferred to avoid uneven heating of the fluid or fluid mixture, which may result in hot spots where the temperature locally is higher than what is aimed at. Thus, in preferred embodiments, at least part of said heating and/or conversion involves heating and/or excitation by microwaves.

Alternatively or in addition thereto, the method according to the present invention may preferably comprise that at least one of said fluids is/are being at least partly heated by heat exchange with the fluid mixture containing the nano-sized material produced, thereby providing a cooling of said fluid mixture containing said nano-sized material produced.

In particular preferred embodiments, maintenance of said fluid mixture at said temperature in a predefined reaction time may preferably comprise adding heat to the mixed fluid in the mixing zone in a manner so that a substantial uniform temperature is obtained of the mixed fluid in the mixing zone. Such a heat addition is preferably performed by exposing the fluid in the mixing zone to micro waves.

In accordance with preferred embodiments of the invention, the mixing may preferably performed in such a manner that the mixed fluid rapidly obtains a substantial spatial uniform temperature distribution in the mixing zone, e.g. hot spots in the mixing zone are substantial avoided. The rapid mixing may in many preferred embodiments be obtained by introducing the fluids into the mixing zone as jets typically in the sense that the ratio of the average velocity of the fluids upstream of said first mixing zone to the average velocity in said first mixing zone ($v/v_{mix}$) is at least 2 such as at least 4 and preferably at least 8 such as at least 16.

The average velocity of the fluids upstream of said mixing zone may preferably be determined as the volume flow of the fluid stream in question divided by the cross sectional area of an inlet to the mixing zone through which the fluid streams into the mixing zone, and the average velocity in said mixing zone may preferably be determined as the total volume flow through the mixing zone divided by a characteristic cross sectional area of the mixing zone. The characteristic cross sectional area may typically for:

a tubular shaped mixing zone with constant cross sectional area, such as a cylindrically shaped mixing zone, be the area of the base, a funnel shaped mixing zone, be the average between the area where the fluids enters into the mixing zone and the area where the mixed fluids leave the mixing zone, a venturi shaped mixing zone, be the cross sectional area in front of the contraction.

Alternatively or in combination thereto, the ratio between the total volume flow through the mixing zone to the volume of the mixing zone may preferably be larger than 1/s, such as larger than 2/s, preferably larger than 5/s, such as larger than 10/s.

In many embodiments according to the present invention said first fluid may further be and/or comprise a precursor and/or reactant for said conversion.

In many applications according to the present invention said nano-sized material is produced in a semi-continuous or continuous mode. A preferred embodiment according to the present invention may be production of said nano-material in a continuous mode.

The pressure of said fluids is generally in the range 100-1000 bar such as in the range 150-500 bar, and preferably in the range 150-350 bar such as in the range 150-300 bar. The temperature after mixing said fluids is generally in the range 100-600 C such as in the range 100-500 C and preferably in the range 150-450 C such as in the range 150-400 C, and even more preferably in the range 175-400 C such as in the range 250-400 C.

In many embodiments according to the present invention, the mixing temperature is above 100 C such as above 150 C, and preferably above 200 C such as above 250 C, and even preferably above 300 C such as above 350 C.

Further in many applications according to present invention, the reaction time for producing said nano-sized material is in the range 0.01 seconds to 5 minutes such as 0.1 seconds to 2 minutes, and preferably in the range 5 seconds to 1 minute such as 5 seconds to 30 seconds and even more preferably in the range 10 seconds to 25 seconds such as in the range 10-20 seconds.

The concentration of said precursor/-s and/or reactant/-s may be in the range 0.001 mole/l to 30 mole/l such as in the range 0.01 to 20 mole/l, and preferably in the range 0.1 mole/l to 10 mole/l such as in the range 0.2-10 mole/l, and even more preferably in the range 0.5 to 5 mole/l.

Another embodiment further involves introduction of a third preheated fluid into said fluid mixture comprising said first and second fluid. Said third fluid may be introduced at substantially the same position as said first and second fluids, or at one or more position/-s downstream of said first mixing point. Said third fluid may further comprise a stabilizing agent and/or catalyst/-s and/or other precursor/-s and/or reactant/-s. Said stabilizing agent/-s and may comprise a surfactant such as a chelating agent and/or ions such as electrolytes.

Further fluids may be introduced at the same position/-s and/or at other mixing points downstream of said first mixing point, and said other fluids may further comprise one or more further precursor/-s and/or reactants.

Suitable precursor/-s and/or reactant/-s according to the present invention may be selected among water, ammonia, hydrazine, alkoxides, acetates, oxalates, acetonates such as acetylacetonates, such as hexafluoroacetyl acetonates, metal salts, metal sulphates, metal nitrates and/or combinations thereof.

Said conversion may be caused by thermal means and/or by a chemical reaction.

The fluids according to the present invention in said fluids may be selected among water, alcohols, ammonia, carbon dioxide, ethers, esters, alkanes having from 5 to 20 carbon atoms, alkenes having from 5-20 carbon atoms and mixtures thereof. In some embodiments of the present invention the fluids may be substantially the same fluid so as to act as a solvent for said conversion, and in specific applications said fluid may participate in a chemical reaction.

In a preferred embodiment said precursor/-s and/or reactants may comprise at least one alkoxide such as a metal and/or semi-metal alkoxide. Said precursor/-s and/or reactant/-s may further comprise water in many embodiment according to the present invention.

In the specific embodiments, wherein said nanomaterial being synthesized according to the present invention is a nitride and/or oxonitrides, ammonia and/or hydrazine may be preferred solvents and/or precursor/-s and/or reactant/-s.

Many preferred embodiments involve controlling the ratio between the reactants so as to to control the specific phase or properties of a specific nano-material being synthesized. In a preferred embodiment one of the reactants comprises water the ratio between the concentration of water to said one or more precursor/-s is/are in the range 1-35, such as in the range 1.5 to 15, and preferably in the range 2 to 15 such as in the range 3 to 15 and even more preferably in the range 4 to 12, such as in the range 5-19.

In many applications according to the present invention said fluid mixture comprises a nano-sized particulate material dispersed or suspended therein. Said dispersed and/or suspended particulate material dispersed or suspended material may be produced according to the present invention and be recycled to said first mixing point for introduction.

It is often desirable to control the stability of said nano-material being produced in said fluid. In many aspects of the present invention said nano-material is stabilized in said fluid mixture by adjusting the temperature and/or pressure. Additionally said nano-material may be stabilized in said fluid mixture by controlling the zeta potential of said fluid mixture, and said controlling is preformed by controlling the pH of said fluid mixture. In a preferred embodiment the zeta potential of said fluid mixture comprising said nano-material may be in the range +/−10 to 70 mV and such as in the range +/−20 to 65 mV, and preferably in the range +/−25 to 60 mV such as in the range +/−30 to 55 mV, and even more preferably in the range +/−30 to 50 mV such as in the range +/−35 to 50 MV.

The zeta potential of the nano-material in said fluid mixture may also be controlled by the controlling the concentration of electrolytes present in said fluid mixture. Such electrolytes may include electrolytes not participating in said conversion and/or reaction of said precursors and/or said reactants.

In many applications of the present invention, the pH is maintained below 6 such as below 5, and preferably below 4 such as below 3, and even more preferably below 2.5 such as 2. Examples of such applications are acid catalyzed reactions. In other applications the pH may be maintained at alkaline conditions e.g. such as to catalyze a base catalyzed reaction. In such applications the pH may be above 8 such as above 9, and preferably above 10 such as above 10.5 and even more preferably above 11 such as above 12.

DETAILED DESCRIPTION OF THE INVENTION

The present invention, and in particular preferred embodiments thereof, will in the following be described in greater details with reference to the accompanying drawings, in which:

FIGS. 1-7 show various embodiments, results and details according to preferred embodiments of the present invention.

The drawings are schematically and shown for the purpose of illustration.

FIG. 1 shows a schematic flow diagram of a preferred embodiment of the present invention. Two fluid streams, fluid 1 and fluid 2 are pressurized (not shown) and heated in a heat exchanger (Heater) prior to introduction of said fluids into the mixing zone, whereafter reactions in the fluid mixture after said mixing zone are quenched by cooling in a cooler and the fluid mixture is expanded through an expansion valve to produce a colloidal suspension of a nano sized material. The second fluid generally comprises at least one pre-cursor and/or reactant. Fluid 1 is generally heated to a temperature above its critical temperature and Fluid 2 may be preheated to a temperature below the temperature of said first fluid and below the thermal decomposition temperature of said first fluid. Further and acid or a base and/or electrolytes may be added to at least one of said fluids to control the pH and/or the zeta potential of said fluid mixture in said mixing zone so as to keep said material produced suspended.

Figure 2:
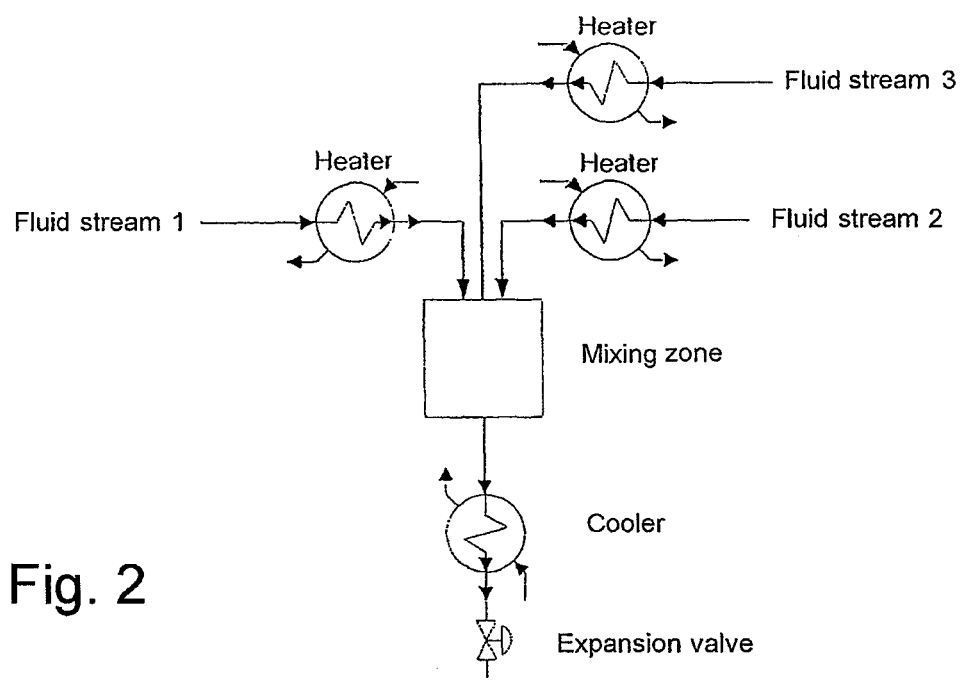

FIG. 2 shows a schematic flow diagram of a preferred embodiment according to the present invention further including a third fluid being pressurized and preheated before being introduced into said mixing zone for mixing with said fluid 1 and fluid 2. Said fluid stream 3 may comprise a further pre-cursor and/or reactant and/or an acid or a base and/or electrolytes for controlling the pH and/or or the zeta potential of said fluid mixture in said mixing zone so as to keep said material produced suspended.

Figure 3:
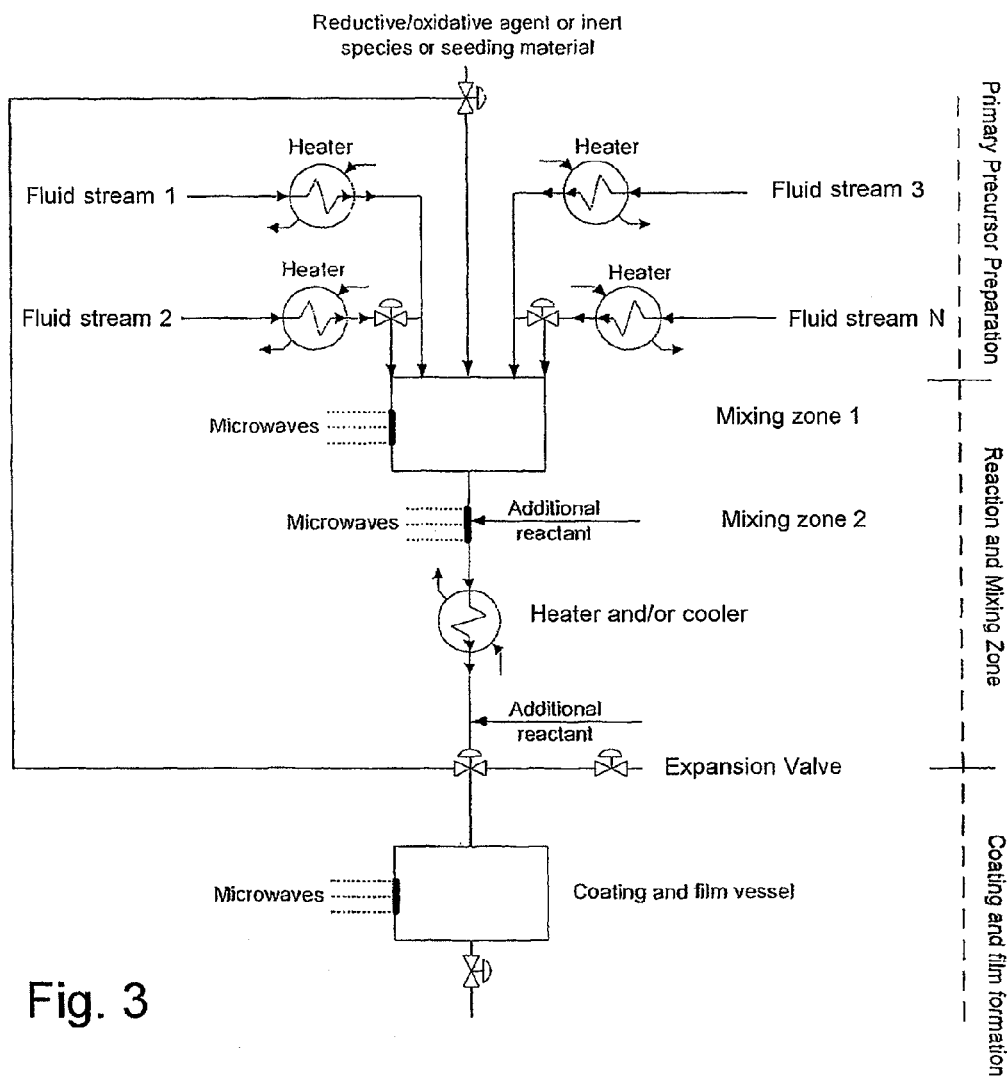

FIG. 3 is a schematic drawing of the present invention for a preferred embodiment. The process may consist of three steps: primary precursor preparation, reaction and mixing zone, and a coating or a film preparation step. The sequence of the steps as well as excluding or/and combining one or two of the steps may be beneficial for different applications. The present invention may be divided in the three steps as described above with predefined times such as the time for preparation of the precursor/-s, $t_{pre}$, the time for mixing, $t_{mix}$, the reaction time, $t_{react}$, and the time for coating or film formation, $t_{coat}$.

In a preferred embodiment of the present invention at least two reactant streams may be mixed in a predefined mixing point. The reactants stream may be a mixture of a precursor and a fluid such as an alcohol, ammonia, $CO_2$, acids, or water. The precursor/-s could comprise at least a metal alkoxide, metal acetate, metal nitride, metal sulphate, or a metal chloride. Furthermore, the reactant stream/-s may be a fluid or fluid mixture. The reactant stream/-s properties may be altered by addition of salts or/and inert species. Furthermore, the reactant stream/-s may be added an oxidative agent such as $H_2O_2$ or a reductive agent such as $H_2$ or urea. The different reaction streams need not to comprise the same fluid/-s. The reactant stream/-s may be heated to a desired temperature before entering the mixing point. Furthermore, two or more reaction streams could be mixed prior to the mixing point. The number of reaction streams to be mixed may be from 2 to 5 or more. The time of mixing/-s, $t_{mix}$, may be varied from 1 sec to 15 min One or more of the reactant stream/-s may include an inert material and/or a catalyst, and/or a seeding material and/or an acid or basic species.

In a preferred embodiment one and/or more stream/-s is overheated creating a temperature gradient in the mixing zone.

The flow rates of the reactant stream/-s may be constant or varied during the process. Furthermore, the reactant streams may have different flow rates. In a particular embodiment with a two stream flow system the flow rate of reactant stream 1, F1, is much higher than the flow rate of reactant stream 2, F2, such as F1>>F2. The flow rates may be varied in a controlled manner such as F1>>F2 or F1>F2 or F1=F2 or F2>F1 or F2>>F1. In a multi flow system the flow rates of the individual flows may be varied depending on the desired process conditions.

Additional microwaves may be included in the mixing step, which could lead to a better and more homogeneous and/or faster mixing.

The reaction/-s may be initiated in the mixing point as well as later in the process. The reaction continues for a given time, $t_{reac}$, and $t_{mix}$ and $t_{reac}$ may be identical. In an embodiment the total reaction time may not exceed 5 min, and may preferable by less than 90 second such as in the range 0.1 to 30 seconds.

During the reaction period the reaction mixture obtained from mixing point 1 may be heated or/and cooled after the mixing point in a controlled manner. The heating and/or cooling treatment may be placed at any point/-s during the reaction period. Furthermore, the reaction mixture may be treated with microwaves, which may help overcoming different energy barriers at low or medium temperatures. The microwaves may help controlling the formation of different crystal orientation and enhance structure and size properties. The microwave treatment may be included at any point during the reaction period. If the process include microwave treatment/-s during the process, the microwave intensities at different places in the process may be different.

One or more additional reactant/-s and/or catalyst/-s and/or seed/-s and/or salt/-s and/or inert material/-s may be added in said mixing zone during the reaction period at any point/-s.

After the reaction period the particles produced by the present invention may be withdrawn from the process as a suspension. The suspension may be a stable or a precipitate depending on the suspension properties such as pH, ion strength, stabilizer addition, and zeta-potential.

In a preferred embodiment the particles are recycled to the mixing zone and may be introduced in the process as homogeneous and/or heterogeneous seeding and/or catalyst material. In another embodiment the recycled prepared particles may be coated with a different material within said mixing and reaction zone.

Furthermore, in a particular embodiment the particles may be used for coating a substrate, where the substrate is placed in the coating vessel prior to the process start. The substrate could be any material with any shape such as a plate, a sphere, a hollow sphere, a cylinder, a wisp as well as a combination of the different shape/-s. Furthermore, the substrate may be a carrier material.

The particles made be the present invention could also be used for thin film preparation. The thickness of the thin film may be less than 100 nm and the crystallite size may be less than 50 nm such as below 20 nm, and preferably less than 10 nm.

During the coating or the film preparation period microwaves may be included to improve the properties of the final product. The time for the coating and the film preparation, $t_{coat}$, may be in the range <1 min to 45 min.

A preferred embodiment for many applications comprises a combination of the steps shown in FIG. 3. For example a sol-gel process may be combined with a hydrothermal treatment. First a sol-gel nuclei formation may be carried out followed by a hydrothermal treatment. The sol-gel and the hydrothermal process comprise one or more of the steps explained above.

Figure 4:
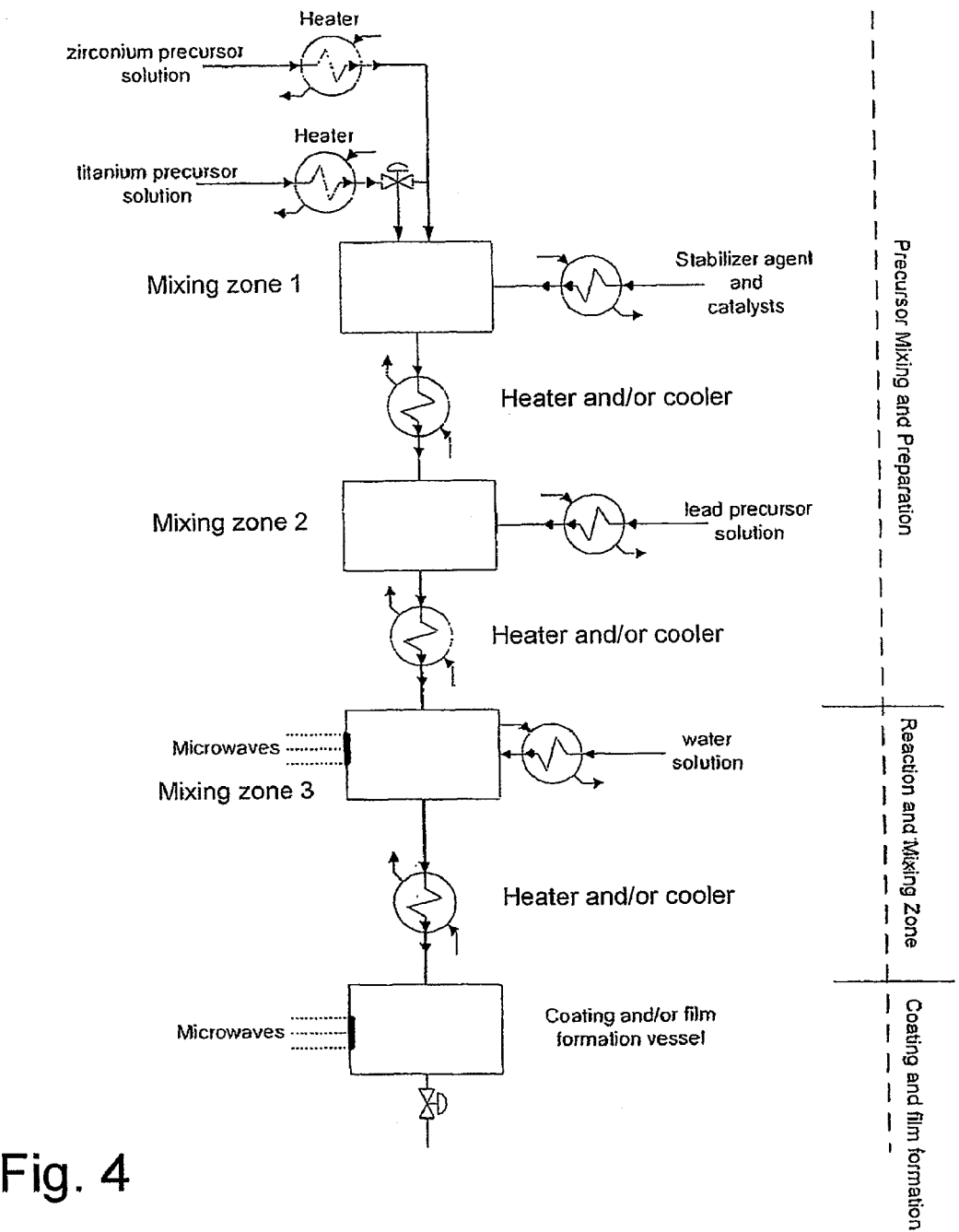

FIG. 4 shows a schematic flow diagram for producing a polymetallic compound according to a preferred embodiment according to the present invention exemplified by the production of PZT($Pb(Zr_xTi_{1-x})O_3$) as a coating. The polymetallic compound is produced by a three step mixing process comprising three subsequent mixing zones for addition of reactants. Fluids containing further pre-cursors and/or reactants are pressurized (not shown) and may be preheated before introduction to said subsequent mixing zones. A further heating or cooling between said subsequent mixing zones may further be performed between said mixing zones.

It should be noticed that a similar process diagram without the coating step may be performed in order to produce the same material in the form of a colloidal suspension. The figure is further described in illustrative example 3.

Figure 5:
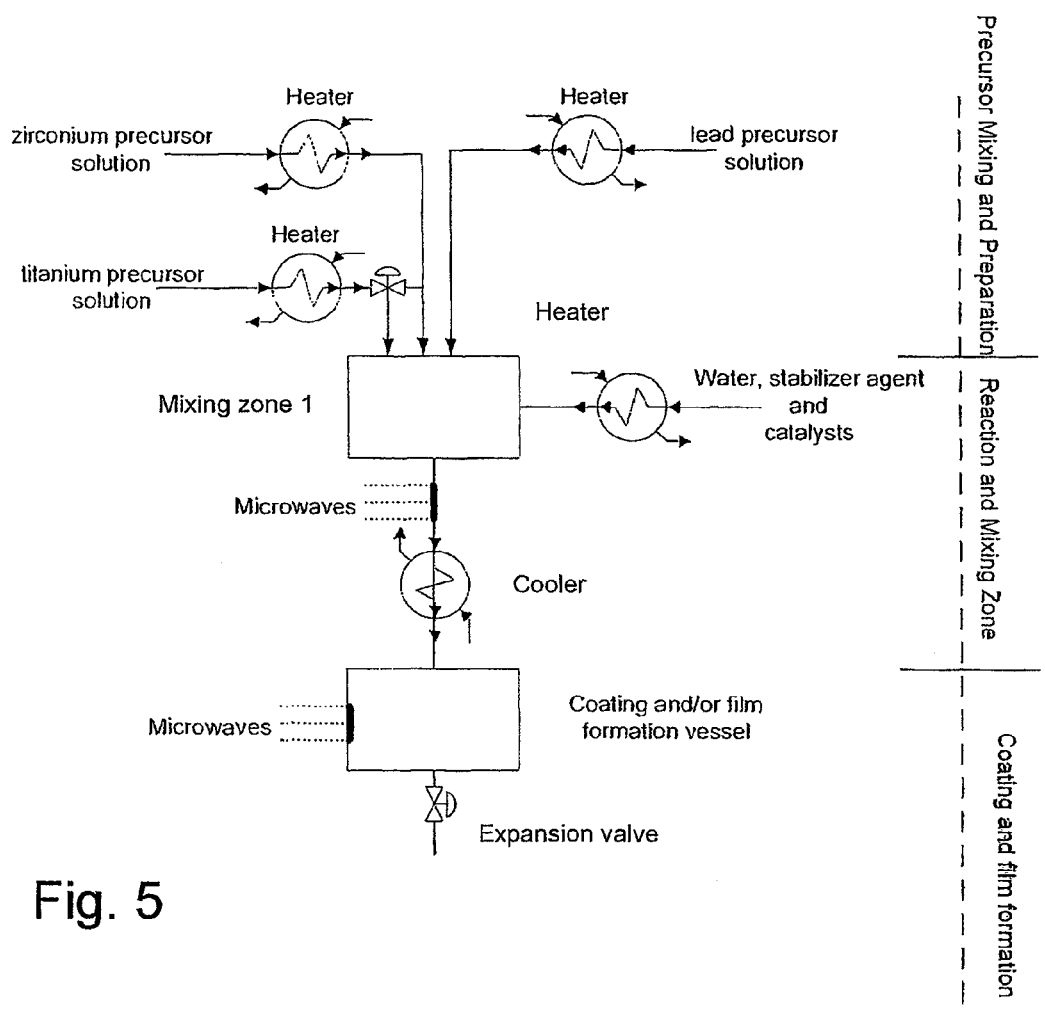

FIG. 5. shows another schematic flow diagram for producing a polymetallic compound according to a preferred embodiment according to the present invention exemplified by the production of PZT($Pb(Zr_xTi_{1-x})O_3$) as a coating similar to FIG. 4, but wherein the mixing of all pre-cursors and/or reactants are performed in said first mixing zone and wherein said fluid mixture from said mixing zone may further be excitated and/or heated using microwaves and may subsequently before entering said vessel for coating and/or film formation on a substrate. The coating and/or film formation may be performed at an elevated pressure as indicated by the position of the expansion valve on the figure.

It should be noticed that a similar process diagram without the coating step may be performed in order to produce the same material in the form of a colloidal suspension. The figure is further described in illustrative example 4.

Figure 6:
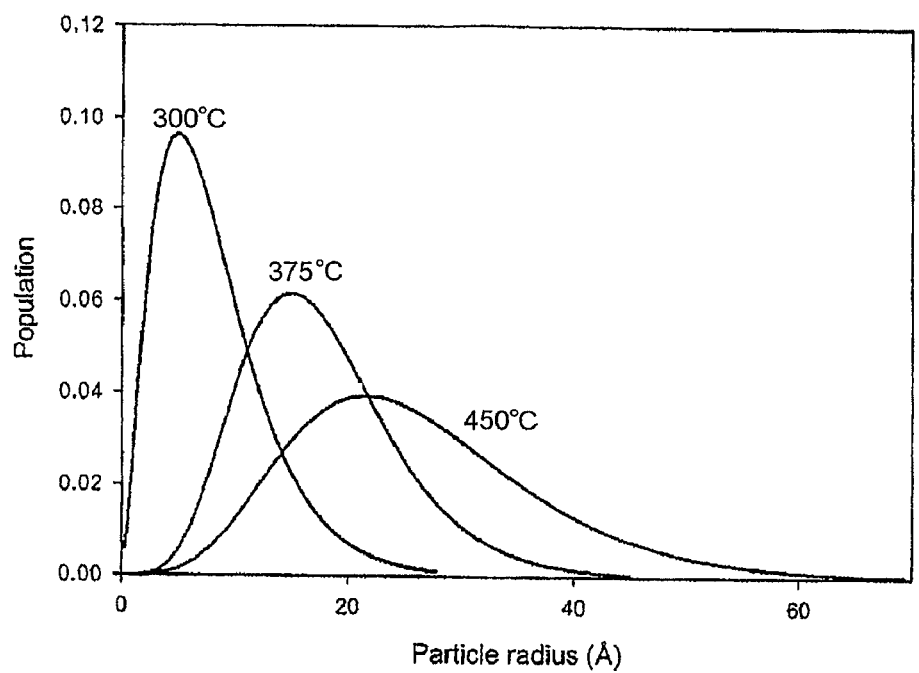

FIG. 6. shows experimental particle size distributions for nanocrystalline zirconia produced by a method according to the present invention at three different temperatures and at a constant pressure of 230 bar in said mixing zone. The particle size distributions determined by small angle X-ray scattering and similar particle sizes was determined from X-ray diffraction measurements. As seen from the figure all experiments resulted in average particle sizes of a few nanometers (1 nanometer=10 Angstrom) and narrow size distribution. It is further seen that both the average size and the width of the size distribution increases with increasing temperature at these conditions. The experiment is further described in example 2.

As indicated for instance in connection with FIG. 3 the mixing zone 1 may preferably comprise addition of heat by transmitting microwaves into the mixing zone. A device 10 suitable for providing mixing and heating the fluid mixture by micro waves is shown schematically in FIG. 7a.

The device 10 comprises a high pressure flow cell 10a, designed to withstand the process conditions of the process. The flow cell 10a is equipped with a microwave transparent high pressure window 10b. Microwaves are generated in the microwave generator (MW), transferred through the wave guide 10c and introduced through the window 10b into the flow cell where the energy of the microwaves is dissipated into the fluid mixture flowing through the cell 10a. The dissipated energy results in a temperature increase in the fluid mixture—or maintenance of the temperature—and may also cause an acceleration of the chemical reactions taking place in the fluid mixture thereby allowing for use of lower temperatures to obtain a nano sized material with predefined characteristics. Further the application of microwaves for heating according to an embodiment of the present invention allows for a very fast and controllable heating thereby solving many problems such as plugging related to prior art processes, and thereby resulting in more controllable production of nanosized materials with predefined characteristics than in the prior art.

Figure 7A:
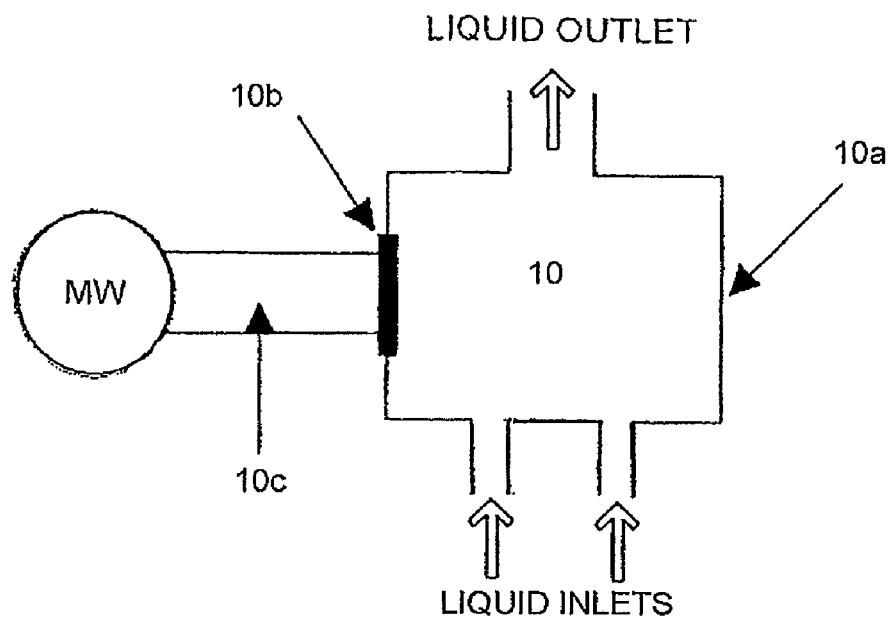

In FIG. 7a, the device 10 is shown to have two inlets and one outlet. However, further inlets may be provided such as four to match the embodiment shown in FIG. 1. The device 10 may be applied at other stages in the process, e.g. at mixing point 2 of FIG. 1 where an additional reagent is added to the output from Mixing point 1.

Figure 7B:
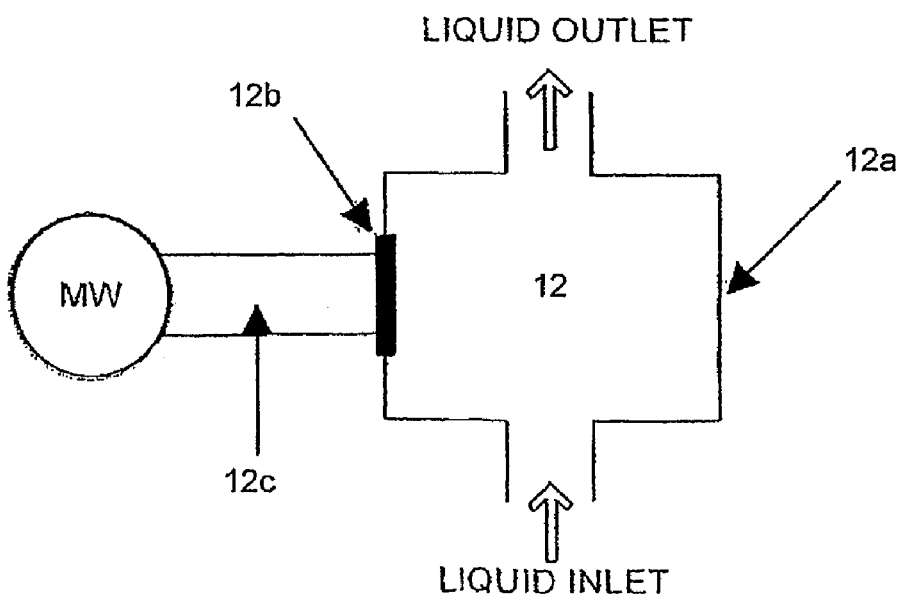

FIG. 7b shows a device 12 similar to the one of FIG. 7a. While the MW, the flow cell 12a, the windows 12b and the wave guide 12c are all equal to the corresponding ones of FIG. 7a, the device 12 comprises only one inlet. The device 12 with only one inlet is applicable in combination with or as an alternative to the heat exchangers used in accordance with the present invention and in particular the heat exchangers shown in FIGS. 1-5 referenced as Heater therein.

EXAMPLE 1

Continuous Production of $TiO_2$

Nanocrystalline TiO2 suspensions according to the present invention was produced using a process diagram as shown in FIG. 1.

Isopropanol (Tc=235.6 C, and Pc=53.7) containing 5 weight % 0.1 M $NH_4OH$ in water was used as fluid 1, and fluid 2 was a 0.1 M solution of titanium isopropoxide (ACROS 98%) in isopropanol. Prior to mixing 10 ml/min of fluid 2 was pressurized to 300 bar and heated to a temperature of 175 C, and 10 ml/min of fluid 1 was pressurized to 300 bar and heated to a temperature of 432 C so as to obtain a mixing temperatures of 320 C. The pH of the fluid mixture was measured to 9.5. The ratio of velocity in the inlet pipes compared to the velocity after mixing was 4.

The fluid mixture was cooled in a heat exchanger before being expanded through a valve.

Powder X-ray diffraction showed that a fully crystalline product of anatase titania having a crystallite size of 11 nm+/−3 nm was produced. The particle size from powder X-ray diffraction was confirmed by small angle X-ray scattering measurements which resulted in a particle size of 12 nm.

EXAMPLE 2

Continuous Production of Zirconia

Nanocrystalline zirconia suspensions according to the present invention was produced using a process diagram as shown in FIG. 1.

Distilled water was used as fluid 1, and a 0.1 M solution of zirconia acetate $Zr(ac)_4$ in water was used as fluid 2. Both fluids was pressurized to a temperature of 230 bars prior to mixing. The flow rate of fluid 1 was 15 ml/min and the flow rate of fluid 2 was 5 ml/min. Fluid 2 was preheated to a temperature of 50 C prior to mixing, and fluid 1 was preheated to a temperature in the range of 410 to 620 C so as to obtain a temperature in the mixing zone in the range of 300 to 450 C.

The results is shown in FIG. 6. As seen from the figure nanocrystalline zirconia with a diameter of a few nanometers is produced for all temperatures. Further it is seen that both the average particle diameter and the width of the particle size distribution increases with temperature Powder X-ray diffraction showed that the zirconia produced was fully crystalline at all three temperatures and that a tetragonal phase is produced at temperatures below the critical temperature, a mixture of tetragonal and monoclinic phase is produced close to the critical temperature (375 C) and that the monoclinic phase is dominant at the high temperature.

Hence, the characteristics of the nano size material can be controlled by proper selection of operating conditions.

ILLUSTRATIVE EXAMPLE 1

Production of $TiO_2$ with a Mixture of Crystal Phases

Nano sized materials comprising mixed crystal phases are important for many practical applications. According to an aspect of the present invention such mixed crystal phases may be produced from a precursor mixture comprising two or more metal alkoxides, metal nitrides, metal sulphates or metal salts, so as to obtain different crystal phases in the same metal oxide product. Different crystal phases may be synthesized from certain metal precursors. For example using a mixture of titanium isopropoxide and amino titanium oxalate leads to a mixture of anatase and rutile, whereas, amino titanium oxalate may used for synthesizing rutile at low temperatures.

ILLUSTRATIVE EXAMPLE 2

Stabilized and or Doped Metal Oxides

Doped metal oxides and/or stabilized metal oxides are important for many technical applications, e.g. photocatalysis or solid oxide fuel cells. Such doped or stabilized metal oxides may according to the present invention be produced by introducing precursors for said doping metal in fluid 2 or in a separate reactant stream, Reactant stream 3.

ILLUSTRATIVE EXAMPLE 3

PZT Coating—Three Steps Mixing

PZT ($Pb(Zr_xTi_{1-x})O_3$) coatings may be produced according to the present invention through a three steps mixing process as shown in FIG. 4. Reactant stream 1 may be a titania precursor for example titanium isopropoxide preheated before entering the mixing point 1. Reactant stream 2 may be a zirconia precursor for example zirconium n-propoxide preheated before entering mixing point. Reactant stream 1 and reactant stream 2 may according to another aspect of the present invention also be mixed prior to entering mixing point 1. One or more chelating ligands or/and stabilizing agents or/and catalysts may also be introduced in mixing point 1 to stabilize the sol/-s. Reactant stream 3 could be a lead precursor such as lead acetate preheated before entering mixing point 2. Reactant stream 1-3 may comprise the same solvent or one or more streams may comprise/-s a different solvent/-s. After mixing point two a stable sol may be created and a stabilizing agent such as diethanolamine may be used. A acid may also be introduced. The stoichiometric ratio, x, between Zr and Ti can be altered by controlling the flow and concentration of the reactants streams.

The temperature in the reaction and mixing zone may be below 500° C., preferably in the range 100-375° C. The pressure may be above the critical point for the fluid and preferably in the range 100-450 bar. The total time for reaction and mixing may be less than 90 seconds and preferably less than 45 seconds. During the reaction and mixing period a microwave treatment may be applied. The microwaves may decrease the crystallization temperature as well as stabilizing the final product properties.

The particles created during the mixing and reaction period may be used for coating a pre-installed substrate. The coating treatment can be performed in the coating vessel and may include a microwave treatment. The coating/-s may have a thickness less than 200 nm and preferably below 50 nm with a crystallite size of less than 20 nm with a narrow crystallite size distribution.

ILLUSTRATIVE EXAMPLE 4

PZT Coating—One Step Mixing

PZT coatings and films may be produced according to the present invention and as explained in Illustrative Example 3; however the mixing of all precursors may be executed in one step as schematically shown in the FIG. 5.

ILLUSTRATIVE EXAMPLE 5

Stabilization of Nano Sized Material in the Fluid by Control of Zeta Potential and/or pH Solid particles dissolved in an electrolyte adsorb specific ions such as —COOH, $OSO_3H$, and $NH_2$ on the surface and are thereby brought up to an electric potential, experimental determined as the zeta-potential. The surface groups can react with either acid or base to provide stabilizing charges. The stability of colloids is related to the zeta-potential and as an a zeta-potential of at least +/−30-50 mV (absolute scale) is required to obtain a stabile suspension, solution or slurry.

The surface electrochemistry of hydrous metal oxides is complicated but in general hydrogen and hydroxyl ions are potential determining for hydrous metal oxides sols:

$$M\text{-}OH + H^+ \rightarrow M\text{-}OH_2^+ \quad (I)$$

$$M\text{-}OH + OH^- \rightarrow M\text{-}O^- + H_2O \quad (II)$$

The pH of the solution has a great impact on the stability of the particles and at a certain pH the net charge is zero. This point is named 'zero-point of charge', zpc. At pH>zpc. Eq(II) is dominant and the particle are negatively charged, whereas at pH<zpc. Eq(II) is dominant and the particles are positively charged. The zeta-potential of oxides is positive at low pH and negative at high pH.

The zeta-potential depends on the deviation of pH from zpc. and the fact that the zeta-potential attracts opposite charged ions present in the solution. Therefore, the zeta-potential is related to the electrolyte concentration and for titanium dioxide the zeta-potential decreases as an increase in for example the KCl concentration.

The zpc. for the rutile phase of titanium dioxide is 6.0, whereas and the zpc. for anatase is at a lower pH. The pzc. also depends on purities present in the powder as well as dispersion agent. If surfactants, chelating agents or other stabilizers are present, their adsorption may determine the surface charge.

Besides influencing the stability of the prepared particles or colloids, a number of important reactions according to the present invention is acid or base catalyzed and thereby it is important to control the pH during said process for production of said nano sized product. The preparation of silical gels and/or particles by a sol-gel reaction is an example showing of the importance to control the pH during particle formation. Both the hydrolysis and condensation of the silica sol-gel process may be acid or catalyst catalyzed. A combination of the two may be optimal. The properties of the final product may be altered depending on the catalyst used. Similar considerations is believed to be important for production of a wide range transition metal oxides according to the present invention.

In many embodiments of to the present invention the pH and/or the zeta potential of the fluid in the mixing zone is/are controlled by addition of acid and/or base to fluid 1 and/or fluid 2 and/or controlled by controlling the concentration of electrolytes in fluid 1 and/or fluid 2 before introduction into said mixing zone.

The invention claimed is:

1. A synthesis method for producing a nano-sized material, said nano-sized material is produced in a semi-continuous or continuous mode, comprising the steps of:
   pressurising a first fluid, and heating said first fluid to a temperature above its critical temperature
   pressurising a second fluid, and heating said second fluid comprising at least one precursor and/or reactant to a second temperature below the first temperature and below the thermal decomposition temperature of said precursor(s) and/or reactant(s), and
   controlling the mixing of the first fluid and the second fluid in a first mixing zone so as to provide a fluid mixture at a temperature causing a conversion of said precursors and/or reactants into a nano-sized material with pre-defined characteristics,
   while the fluid is in the mixing zone maintaining said fluid mixture at said temperature in a predefined reaction time,
   cooling said fluid mixture to a temperature below 100° C.,
   expanding said fluid mixture in one or more step/-s,
   wherein the zeta potential of said fluid mixture is controlled so that the zeta potential of said fluid mixture comprising said nano-material is in the range −20 mV to −65 mV or in the range of 20 mV to 65 mV so as to keep the produced material suspended in the fluid mixture, the controlling of the zeta potential of the mixed fluid is performed by controlling the pH value of said fluid mixture by addition of acid and/or base and/or is controlled by the controlling the concentration of electrolytes present in said fluid mixture,
   the ratio of the average velocity of the fluids upstream of said first mixing zone to the average velocity in said first mixing zone $(v/v_{mix})$ is at least 8.

2. A method according to claim 1, wherein the ratio of the average velocity of the fluids upstream of said first mixing zone to the average velocity in said first mixing zone $(v/v_{mix})$ is at least 16.

3. A method according to claim 1, wherein the average velocity of the fluids upstream of said mixing zone is determined as the volume flow of the fluid stream in question divided by the cross sectional area of an inlet to the mixing zone through which the fluid streams into the mixing zone.

4. A method according to claim 1, wherein the average velocity in said mixing zone is determined as the total volume flow through the mixing zone divided by a characteristic cross sectional area of the mixing zone, the characteristic cross sectional area is typically for:
   a tubular shaped mixing zone with constant cross sectional area, the area of the base,
   a funnel shaped mixing zone, the average between the area where the fluids enter into the mixing zone and the area where the mixed fluid leaves the mixing zone,
   a venturi shaped mixing zone, the cross sectional area in front of the contraction.

5. A method according to claim 1, wherein the ratio between the total volume flow through the mixing zone to the volume of the mixing zone is larger than 1/s, such as larger than 2/s, preferably larger 5/s, such as larger 10/s.

6. A method according to claim 1, wherein at least part of said heating and/or conversion involve heating and/or excitation by microwaves.

7. A method according to claim 1, wherein at least one of said fluids is/are being at least partly heated by heat exchange with the fluid mixture containing said nanomaterial produced, thereby providing a cooling of said fluid mixture containing said nano-sized material produced.

8. A method according to claim 1, wherein said cooling of said fluid mixture involves a further cooling step subsequent to said first cooling step.

9. A method according to claim 1, wherein a nano-sized material with predefined characteristics is obtained by controlling the pressure and temperature in said first mixing zone.

10. A method according to claim 1, wherein said predefined characteristics of said nano-sized material includes controlling crystal size and/or crystallinity and/or crystal phase/-s and/or crystal size distribution and/or, crystal composition, and/or crystal shape.

11. A method according to claim 1, wherein the addition acid and/or base is made to the first and/or second fluid before mixing.

12. A method according to claim 1, wherein the controlling of the concentration of electrolytes present in said fluid mixture is made by adding one or more electrolyte to the first and/or second fluid before mixing.

13. A method according to claim 1, wherein maintaining said fluid mixture at said temperature in a predefined reaction time comprising adding heat to the mixed fluid in the mixing zone in a manner so that a substantial uniform temperature is obtained of the mixed fluid in the mixing zone.

14. A method according to claim 13, wherein heat is added by exposing the fluid in the mixing zone to micro waves.

15. A method according to claim 1, wherein said second fluid comprises at least one precursor and/or reactant for said conversion.

16. A method according to claim 1, wherein the pressure of said fluid mixture is in the range 100-1000 bar.

17. A method according to claim 1, wherein the pressure of the fluid mixture is used to control the shape and morphology of said nano-sized material.

18. A method according to claim 1, wherein said first fluid is heated to a temperature of at least 450° C. before entering, into said first mixing zone, and heating said second fluid to a temperature of maximum 250° C., and the ratio of mass flows of said fluid streams are controlled so as to obtain a fast mixing and predefined temperature in said first mixing zone.

19. A method according to claim 1, wherein the temperature in said first mixing zone is in the range 100°-600° C.

20. A method according to claim 1, wherein the temperature in said first mixing zone is above 100° C.

21. A method according to claim 1, wherein said predefined reaction time for producing said nano-sized material is in the range 0.01 seconds to 5 minutes.

22. A method according to claim 1, wherein the concentration of said precursor/-s and/or reactant/-s in the fluid mixture is/are in the range 0.001 mole/l to 30 mole/l.

23. A method according to claim 1, wherein the pH value of the fluid mixture is below 6.

24. A method according to claim 1, wherein the pH value of the fluid mixture is above 8.

25. A method according to claim 1, wherein said precursor/-s and/or reactant/-s is/are selected among water, ammonia, hydrazine, metal and/or semi-metal alkoxides and/or metal and/or semi metal acetates, and/or metal and/or semi-metal oxalates, and/or metal and/or semi metal acetonates, metal and/or semi metal salts, metal and/or semi metal sulphates, metal and/or semi metal nitrates and/or metal and/or semi metal carbonates and combinations thereof.

26. A method according to claim 1, wherein said conversion is caused by thermal decomposition and/or by one or more chemical reactions.

27. A method according to claim 1, wherein said fluids are selected among and/or comprises hydrogen, water, alcohols, ammonia, carbon dioxide, hydrazine, ether, esters, alkanes having from 5 to 20 carbon atoms, alkenes having from 5-20 carbon atoms and mixtures thereof.

28. A method according to claim 1, wherein said reaction involves at least one sol-gel reaction.

29. A method according to claim 1, wherein said precursor/-s and/or reactants comprises at least one alkoxide.

30. A method according to claim 1, wherein said precursor/-s and/or reactant/-s comprises water.

31. A method according to claim 1, wherein one of said reactants comprises water and wherein the ratio between the concentration of water to said one or more precursor/-s is/are in the range 1-35 mole/l.

32. A method according to claim 1, wherein one of said fluids comprises a nano-sized particulate material dispersed or suspended therein.

33. A method according to claim 32, wherein said nano sized particulate material is produced according to the method and recycled to said first mixing zone.

34. A method according to claim 1, wherein a preheated third fluid is introduced and mixed with said fluid mixture comprising said first and second fluid.

35. A method according to claim 34, wherein said third fluid comprises a stabilizing agent and/or a catalyst and/or another precursor and/or reactant.

36. A method according to claim 35, wherein said introduction of said third fluid is performed in said first mixing zone for mixing of said first and said second fluid.

37. A method according to claim 1, wherein one or more further fluids/-s is/are introduced at a position downstream of said first mixing zone said fluids further comprises one or more precursor/-s and/or reactants.

38. A method according to claim 1, wherein at least part of said heating and/or conversion involve excitation and/or heating by microwaves.

39. A method according to claim 38, wherein the heating after said first mixing zone and/or second mixing zone and/or third mixing zone is at least partly performed by heating using microwaves.

40. A method according to claim 1, the crystallinity of said nano-sized material formed is above 30%.

41. A method according to claim 1, wherein said nano-sized material has an average particle size below 30 nanometer.

42. A method according to claim 1, wherein the nano-sized material is in the form of spheres, hollow spheres, cylinders, needles, wires, tubes, double and/or multi-walled tubes, flakes, rhombic structures.

43. A method according to claim 1, wherein said nano-sized material comprises a core-shell structure.

44. A method according to claim 1, wherein said nano-sized material is in the form of a colloidal suspension.

45. A method according to claim 1, wherein a colloidal suspension is produced, and wherein the concentration of said nano-sized material in said colloidal suspension is up to 30% by weight.

46. A method according to claim 1, wherein a colloidal suspension is produced, and wherein the concentration of said nano-sized material in said colloidal suspension is above 0.1% by weight.

47. A method according to claim 1, wherein said nano-sized material comprises one or more oxides and/or one or more hydroxides and/or and one or more nitrides and/or one or more oxo-nitrides and/or one or more carbides and/or one or more sulfides or combinations thereof.

48. A method according to claim 1, wherein said nano-sized material comprises one or more metal/-s and/or one or more semi-metal/-s.

49. A method according to claim 1, wherein said nano-sized material comprises one or more of the elements Ti, Zr, Al, Si, Zn, Ge, Ba, Sr, Fe, Ni, Co, Yt, Ce, Bi, Te, Se, Sc, Au, Ag, Pd, Pt, Pb, Ru and combinations thereof.

50. A method according to claim 1, wherein said nano-sized material comprises a titanate and/or a zirconate.

* * * * *